United States Patent
Lin (10) Patent No.: US 11,688,152 B2
(45) Date of Patent: Jun. 27, 2023

(54) PREPROCESSING METHOD AND PREPROCESSING SYSTEM FOR IMPROVING IMAGE RECOGNITION

(71) Applicant: UNIVERSAL GLOBAL SCIENTIFIC INDUSTRIAL CO., LTD., Nantou County (TW)

(72) Inventor: Cheng-Lung Lin, Nantou County (TW)

(73) Assignee: UNIVERSAL GLOBAL SCIENTIFIC INDUSTRIAL CO., LTD., Nantou County (TW)

(*) Notice: Subject to any disclaimer, the term of this patent is extended or adjusted under 35 U.S.C. 154(b) by 137 days.

(21) Appl. No.: 17/142,512

(22) Filed: Jan. 6, 2021

(65) Prior Publication Data

US 2022/0094835 A1    Mar. 24, 2022

(30) Foreign Application Priority Data

Sep. 22, 2020    (TW) .................................. 109132683

(51) Int. Cl.
*G06V 10/141* (2022.01)
*H04N 23/74* (2023.01)
(Continued)

(52) U.S. Cl.
CPC .......... *G06V 10/141* (2022.01); *G06V 10/147* (2022.01); *H04N 23/61* (2023.01);
(Continued)

(58) Field of Classification Search
CPC ............ H04N 5/2354; H04N 5/23218; H04N 9/0451; H04N 9/735; H04N 23/74;
(Continued)

(56) References Cited

U.S. PATENT DOCUMENTS

| 8,363,157 B1 * | 1/2013 | Han | H04N 5/2256 |
| | | | 348/370 |
| 9,519,841 B2 * | 12/2016 | Sawaki | G06V 10/10 |

(Continued)

FOREIGN PATENT DOCUMENTS

| CN | 102279504 A | 12/2011 |
| CN | 104834152 A | 8/2015 |

(Continued)

OTHER PUBLICATIONS

Ledgo LG-320C Ring LED light instruction manual (Year: 2020).*
(Continued)

*Primary Examiner* — Twyler L Haskins
*Assistant Examiner* — Angel L Garces-Rivera
(74) *Attorney, Agent, or Firm* — Li & Cai Intellectual Property (USA) Office (57) ABSTRACT

A preprocessing method and a preprocessing system for improving image recognition are provided. The preprocessing method includes the following steps: disposing light-emitting diodes to surround an image sensor, in which the image sensor corresponds to an image capture region; turning on the light-emitting diodes for emitting a white light source having a color temperature of 3200K, in which the white light source has a fixed illumination area range, and the illumination area range covers the image capture region, such that a color temperature of the image capture region is approximately or equal to 3200K; and turning off the light-emitting diodes for a time interval, such that the image sensor captures images to generate preprocessing frames under a low illuminance condition that is between 0.0004 lux and 1 lux.

10 Claims, 5 Drawing Sheets

(51) Int. Cl.
  *H04N 23/61* (2023.01)
  *G06V 10/147* (2022.01)
  *H05B 45/10* (2020.01)
  *G06V 10/56* (2022.01)
  *G06V 10/60* (2022.01)
  *G06V 10/24* (2022.01)

(52) U.S. Cl.
  CPC .............. *H04N 23/74* (2023.01); *G06V 10/24* (2022.01); *G06V 10/56* (2022.01); *G06V 10/60* (2022.01); *H05B 45/10* (2020.01)

(58) Field of Classification Search
  CPC ........ H04N 23/61; H04N 23/84; H04N 23/88; G06V 10/141; G06V 10/24; G06V 10/56; G06V 10/60; G06V 10/147; H05B 45/10; G06K 9/00503; G06F 2218/02
  See application file for complete search history.

(56) References Cited

U.S. PATENT DOCUMENTS

| | | |
|---|---|---|
| 9,521,308 B2 | 12/2016 | Chu |
| 9,563,798 B1 | 2/2017 | Laser et al. |
| 10,356,376 B2 | 7/2019 | Usui et al. |
| 2003/0160889 A1 | 8/2003 | Angeli |
| 2011/0032350 A1 | 2/2011 | Kikuchi et al. |
| 2018/0159624 A1 | 6/2018 | Jang et al. |

FOREIGN PATENT DOCUMENTS

| | | |
|---|---|---|
| CN | 109643385 A | 4/2019 |
| CN | 109845242 A | 6/2019 |
| EP | 3605497 A1 | 2/2020 |
| JP | 2007174563 A | 7/2007 |
| JP | 2009259703 A | 11/2009 |
| JP | 2013142708 A | 7/2013 |
| JP | 2014219602 A | 11/2014 |
| TW | I393943 B | 4/2013 |
| TW | 202034281 A | 9/2020 |
| WO | WO 2013065868 A1 | 5/2013 |

OTHER PUBLICATIONS

Wayback Machine for Ledgo LG-320C Ring LED light (Year: 2020).*

Illuminance—Recommended Light Level, The Engineering ToolBox (Year: 2004).*

* cited by examiner

PREPROCESSING METHOD AND PREPROCESSING SYSTEM FOR IMPROVING IMAGE RECOGNITION

CROSS-REFERENCE TO RELATED PATENT APPLICATION

This application claims the benefit of priority to Taiwan Patent Application No. 109132683, filed on Sep. 22, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system and a method for image recognition, and more particularly to a preprocessing system and a preprocessing method for improving image recognition.

BACKGROUND OF THE DISCLOSURE

Currently, some vehicles are configured to include an adaptive driving beam (ADB). The adaptive driving beam is capable of controlling each of light and dark regions such as to correspond to positions of oncoming vehicles and vehicles ahead through cooperation of software, firmware and hardware, so as to avoid causing discomfort to drivers of the oncoming vehicles and the vehicles ahead by emitting strong light.

However, it is difficult to precisely recognize an illuminating object during nighttime. The illuminating object in the night may be self-illuminating objects or light-reflecting objects. For example, the self-illuminating objects can be headlamps of a vehicle, and the light-reflecting objects can be pedestrians or other vehicles on the road. In current technologies, although an image of an illuminating object in front of a vehicle can be recognized, but under severe weather conditions such as rain or fog, recognizing the image becomes more difficult and sometimes even impossible. The illuminating object needs to be clearly recognized, so that appropriate processing may be performed accordingly.

Therefore, it has become an important issue in the field to apply an effective image preprocess, so as to improve image recognition during nighttime and reduce misjudgments.

SUMMARY OF THE DISCLOSURE

In response to the above-referenced technical inadequacies, the present disclosure provides a preprocessing method for improving image recognition. The preprocessing method includes: disposing at least one light-emitting diode to surround an image sensor, in which the image sensor corresponds to an image capture region; turning on the at least one light-emitting diode, such that the at least one light-emitting diode emits at least one white light source having a color temperature of 3200K, in which the at least one white light source has a fixed illumination area range, and the illumination area range covers the image capture region, so that a color temperature of the image capture region is approximately or equal to 3200K; and turning off the at least one light-emitting diode for a time interval, such that the image sensor captures images to generate a preprocessing frame under a low illuminance condition between 0.0004 lux and 1 lux.

In another aspect, the present disclosure provides a preprocessing method for improving image recognition, including: disposing three light-emitting diodes at a left side, a right side, and a lower side of an image sensor, respectively, in which the image sensor corresponds to an image capture region; turning on the three light-emitting diodes, such that each of the light-emitting diodes emits at least one white light source having a color temperature of 3200K, in which each of the white light sources has a fixed illumination area range, and the illumination area ranges of the three white light sources at least cover one half of the image capture region, such that a color temperature of the covered half of the image capture region is approximately or equal to 3200K; turning off the three light-emitting diodes for a time interval, such that the image sensor captures images to generate a preprocessing frame under a low illuminance condition between 0.0004 lux and 1 lux; and alternatingly turning on and off the three light-emitting diodes, such that the image sensor generates a plurality of the preprocessing frames.

In yet another aspect, the present disclosure provides a preprocessing system for improving image recognition, including an image sensor and three light-emitting diodes. The image sensor corresponds to an image capture region. The three light-emitting diodes are disposed at a left side, a right side, and a lower side of the image sensor, respectively. Each of the light-emitting diodes emits at least one white light source having a color temperature of 3200K, and each of the white light sources has a fixed illumination area range. The illumination area ranges of the three white light sources at least cover one half of the image capture region, such that a color temperature of the covered half of the image capture region is approximately or equal to 3200K. The image sensor generates a preprocessing frame under a low illuminance condition between 0.0004 lux and 1 lux, and the low illuminance condition is generated by turning on and off the three light-emitting diodes once.

One of the beneficial effects of the present disclosure is that, by virtue of "disposing the three light-emitting diodes at a left side, a right side, and a lower side of the image sensor, respectively, in which the image sensor corresponds to the image capture region", "turning on the three light-emitting diodes, such that each of the light-emitting diodes emits at least one white light source having a color temperature of 3200K, in which each of the white light sources has a fixed illumination area range, and the illumination area ranges of the three white light sources at least cover one half of the image capture region, such that a color temperature of the covered half of the image capture region is approximately or equal to 3200K", "turning off the three light-emitting diodes for a time interval, such that the image sensor captures images to generate a preprocessing frame under a low illuminance condition between 0.0004 lux and 1 lux", and "alternatingly turning on and off the three light-emitting diodes, such that the image sensor generates a plurality of the preprocessing frames", the preprocessing method for improving image recognition provided in the present disclosure is capable of improving image recognition during nighttime and reducing misjudgments.

Another beneficial effect of the present disclosure is that, by virtue of "the image sensor corresponding to the image capture region", "the three light-emitting diodes being disposed at a left side, a right side, and a lower side of the image sensor, respectively, each of the light-emitting diodes emitting at least one white light source having a color temperature of 3200K, and each of the white light sources having a fixed illumination area range", "the illumination area ranges of the three white light sources at least covering one half of the image capture region, such that a color temperature of the covered half of the image capture region is approximately or equal to 3200K", and "the image sensor generating a preprocessing frame under a low illuminance condition between 0.0004 lux and 1 lux, and the low illuminance condition being generated by turning on and off the three light-emitting diodes once", the preprocessing system for improving image recognition provided in the present disclosure is capable of improving image recognition during nighttime and reducing misjudgments.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 3 is a schematic view of an image capture region when light-emitting diodes of FIG. 2 are turned on.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
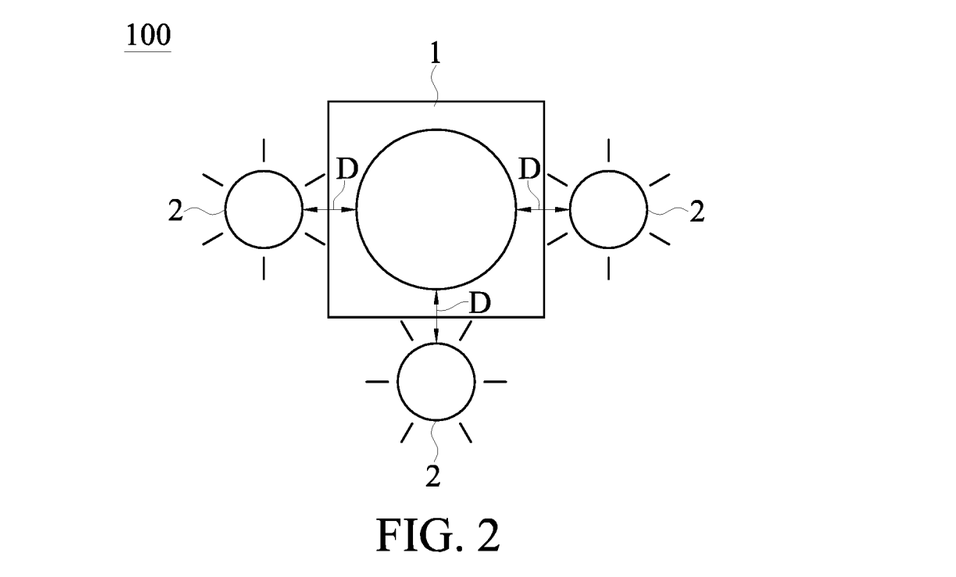
FIG. 2 is a schematic view of a preprocessing system for improving image recognition in one embodiment of the present disclosure.

The present disclosure provides a preprocessing system for improving image recognition, and the preprocessing system is installed mainly on a vehicle for assisting recognition of objects in front of the vehicle when the vehicle is driven. Referring to FIG. 2, a preprocessing system 100 provided in the present disclosure mainly includes an image sensor 1 and light-emitting diodes 2. Basically, the image sensor 1 and the light-emitting diodes 2 may be installed at any location on a vehicle for facilitating recognition of the objects in front of the vehicle, and the light-emitting diodes 2 can be disposed to surround the image sensor 1.

The image sensor 1 can be a common image sensing member as seen in a digital camera or a smartphone, and can include a light sensing element and a processor (not shown in figures). The light sensing element is an element that transforms optical images into electrical signals, and can be a charge-coupled device (CCD) or a complementary metal oxide semiconductor (CMOS) active pixel sensor. The processor is a frame signal processing chip. After the light sensing element receives light, the light is transformed into the electrical signal and then is transmitted to the processor. The processor then performs calculation, such as performing automatic white balance adjustment and automatic exposure adjustment, and generates a digital image that can be finally stored into a storage media.

Figure 3:
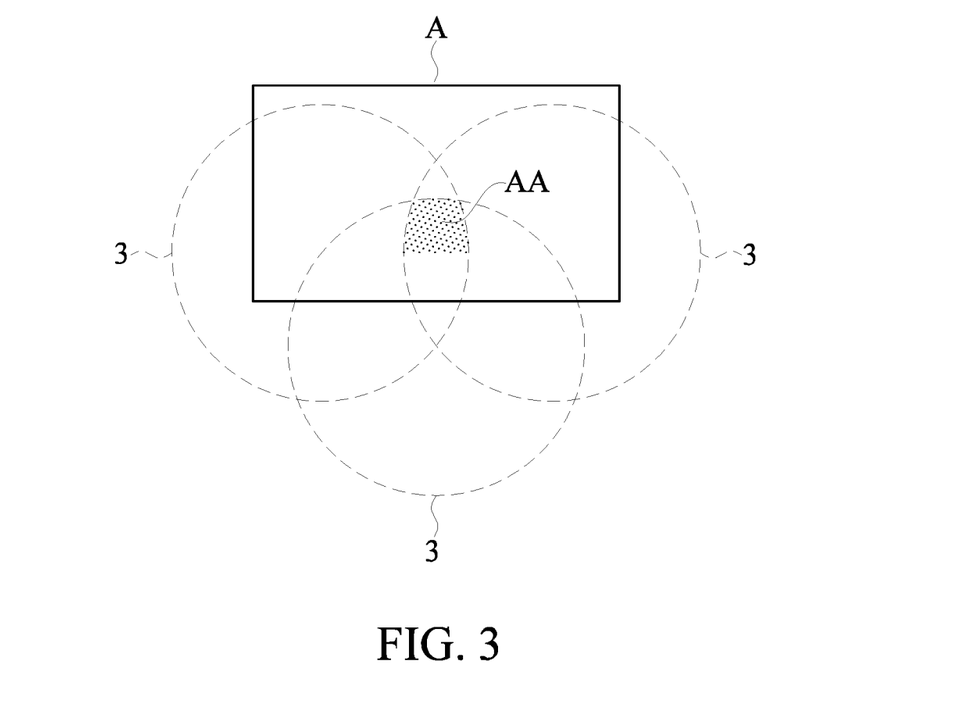

When the digital camera is used for taking photo, a lens of the digital camera is aimed at a target object. During photo taking, light emitted or reflected by the target object enters into the digital camera through the lens and is projected on the image sensor 1, such that a digital image of the target object is generated. In other words, a light receiving region of the image sensor 1 is an image capture region A. As in the present disclosure, the image sensor 1 corresponds to the image capture region A (as shown in FIG. 3).

Furthermore, in the present disclosure, a light-emitting diode (LED) is a white light LED that emits a white light source. More specifically, the white light LED used in the present disclosure is a white light LED having a color temperature of 3200K. A color temperature is a color of light. The higher the color temperature is, the closer to white the color of light will be, while the lower the color temperature is, the closer to yellow the color of light will be.

Embodiment

Figure 1:
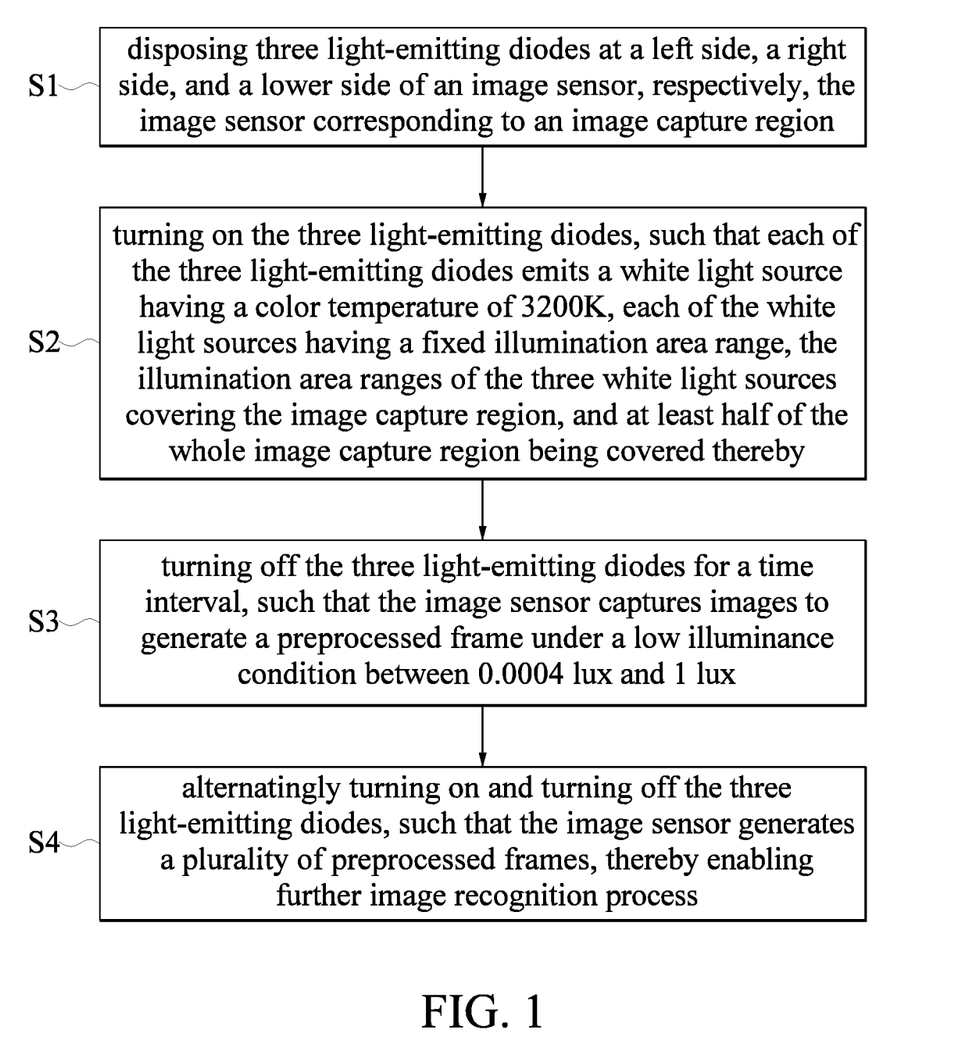
FIG. 1 is a flowchart of steps of a preprocessing method for improving image recognition in the present disclosure.

Referring to FIG. 1, a preprocessing method for improving image recognition is provided in the present disclosure, and includes steps as follows.

Step S1: referring to FIG. 2, disposing three light-emitting diodes 2 at a left side, a right side, and a lower side of an image sensor 1, respectively, in which the image sensor 1 corresponds to an image capture region A.

It should be noted that, the present disclosure is not limited to the above-mentioned example. The quantity and positions of the light-emitting diodes 2 surrounding the image sensor 1 can be adjusted according to actual requirements.

Step S2: referring to FIG. 3, turning on the three light-emitting diodes 2, such that each of the three light-emitting diodes 2 emits a white light source having a color temperature of 3200K. Each of the white light sources has a fixed illumination area range 3. An arrangement of the three light-emitting diodes 2 and the image sensor 1 allows the illumination area ranges 3 of the three white light sources to cover the image capture region A, and at least half of the whole image capture region A is covered thereby.

In the present embodiment, the three light-emitting diodes 2 are disposed at a left side, a right side, and a lower side of the image sensor 1, respectively, such that the illumination area ranges 3 of the three white light sources cover at least lower half of the whole image capture region A.

Figure 4:
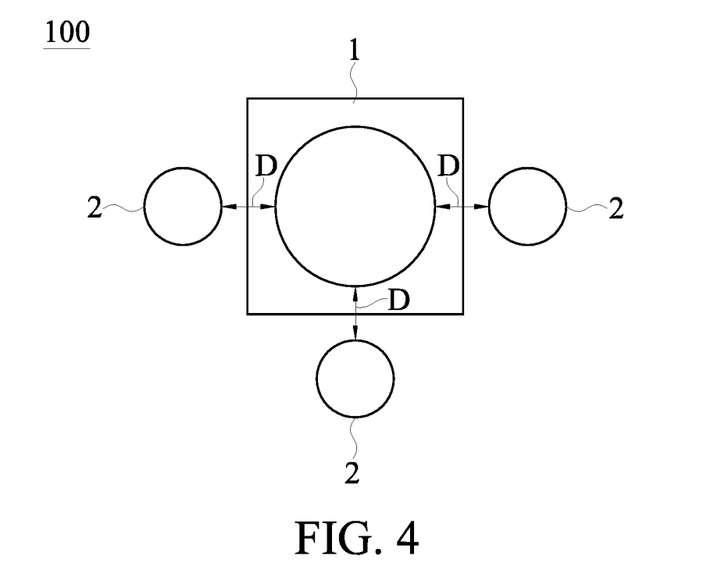
FIG. 4 is another schematic view of the preprocessing system for improving image recognition in one embodiment of the present disclosure.
Figure 5:
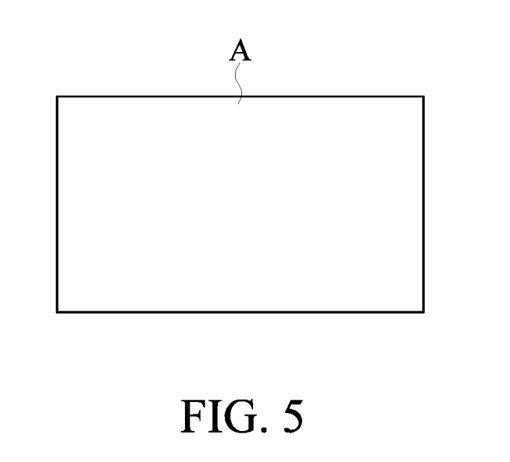
FIG. 5 is a schematic view of the image capture region when the light-emitting diodes of FIG. 4 are turned off.

Step S3: referring to FIG. 4 and FIG. 5, turning off the three light-emitting diodes 2 for a time interval T, such that the image sensor 1 captures images to generate a preprocessing frame M under a low illuminance condition between 0.0004 lux and 1 lux.

Figure 6:
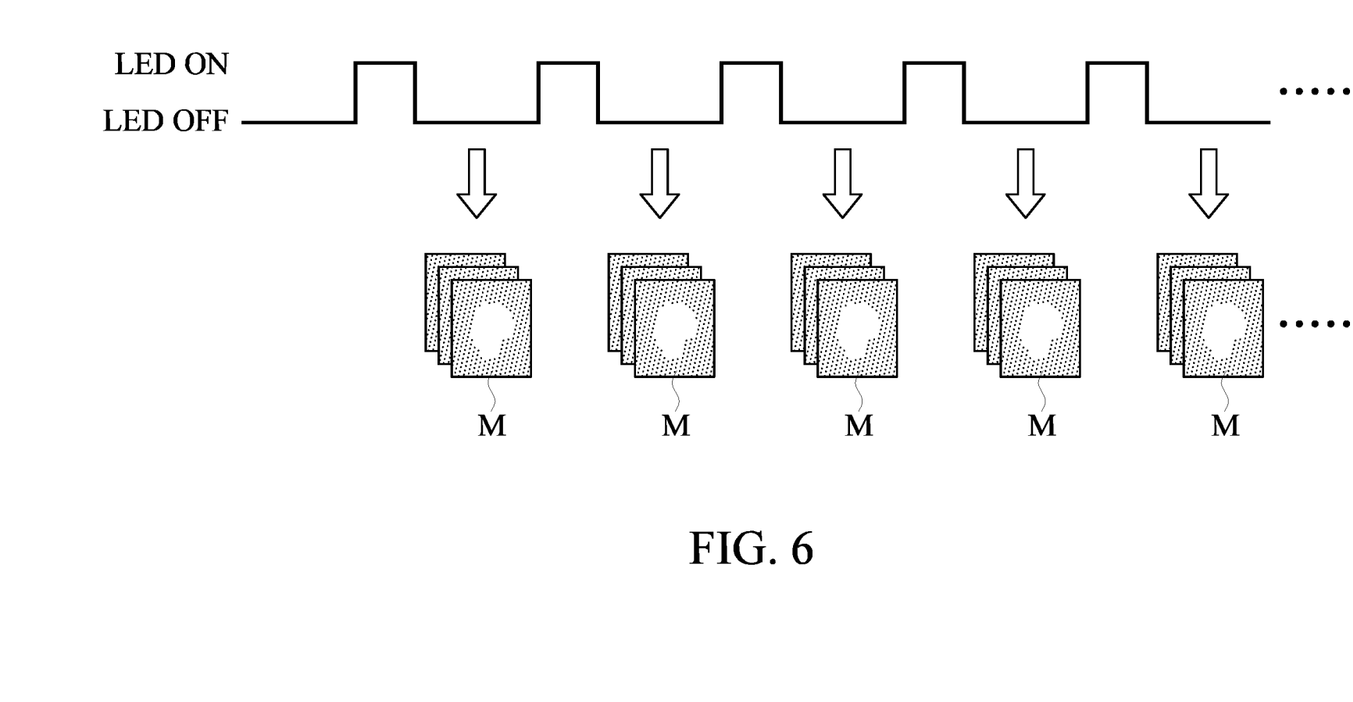
FIG. 6 is a schematic view of the light-emitting diodes of the present disclosure being alternatingly turned on and turned off

Step S4: repeatedly performing step S2 and step S3 to have the three light-emitting diodes 2 alternatingly turned on and turned off, such that the image sensor 1 generates a plurality of the preprocessing frames M for subsequent image recognition processing, as shown in FIG. 6.

It should be noted that, the color temperature of the three white light sources is 3200K. Therefore, an overlapping region AA of the illumination area ranges 3 of the three white light sources in the image capture region A has a color temperature closer to or equal to 3200K. At this time, the image sensor 1 performs automatic white balance adjustment after receiving light, such that a frame predetermined to be captured also has a color temperature that is approximately or equal to 3200K.

Under normal circumstances, the light-emitting diodes 2 are turned off. The light-emitting diodes 2 are only turned on during nighttime or under severe weather conditions when recognition of objects ahead of the vehicle is performed, and the image sensor 1 begins to capture frames of the objects. Furthermore, the image sensor 1 generally captures N frames in one second. As such, when the light-emitting diodes 2 are turned on and the image sensor 1 begins to capture frames, the time required for completing automatic white balance adjustment is generally under one second.

Figure 7:
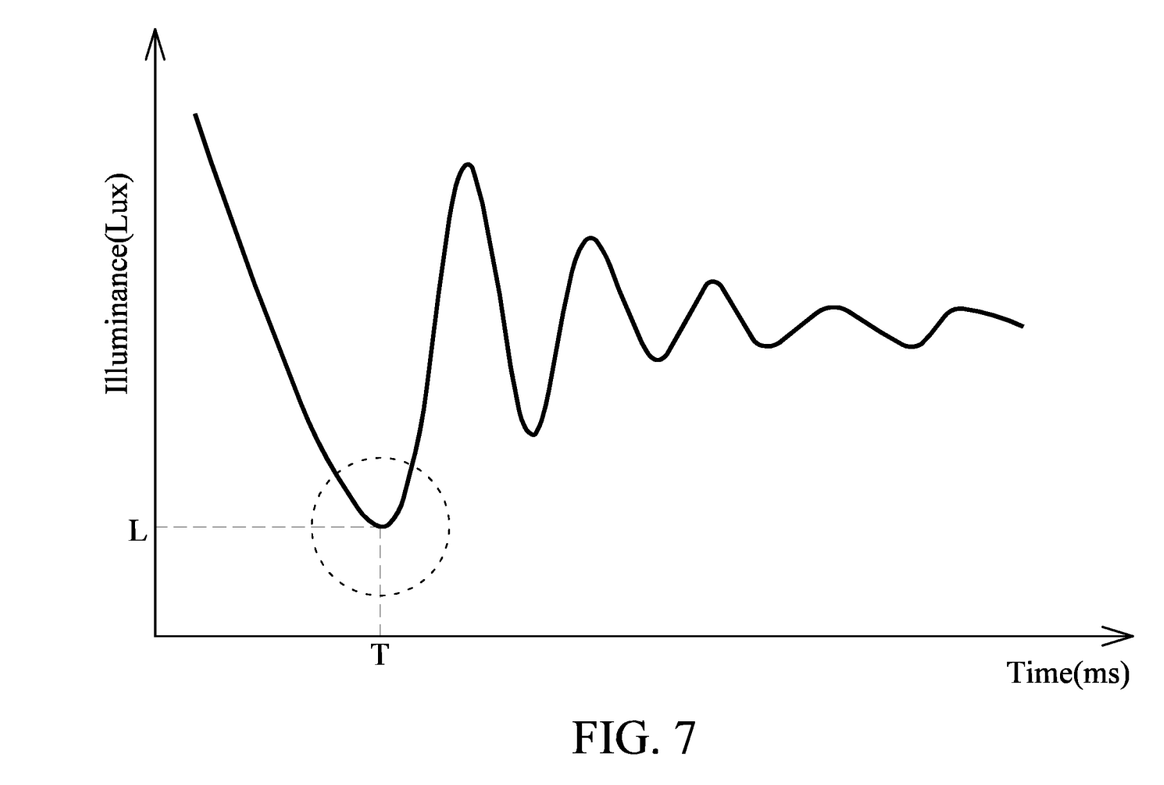
FIG. 7 is a curve diagram of illuminance versus time when an image sensor of the present disclosure receives light.

Moreover, by turning off the three light-emitting diodes 2 for the time interval T, the image sensor 1 is under a low illuminance condition that is between 0.0004 lux and 1 lux. At the time of turning off the three light-emitting diodes 2, an illuminance received by the image sensor 1 is also decreased. The illuminance represents a luminous flux received by a unit area, and is measured in units of lux. The main technical feature of the present disclosure is that the image sensor 1 performs image capture at a time when the illuminance of the image sensor 1 is at the lowest, as shown in FIG. 7. FIG. 7 is a curve diagram of illuminance versus time when the image sensor 1 of the present disclosure receives light. When the light-emitting diodes 2 are turned off, the image sensor 1 stops receiving light. At the time the image sensor 1 stops receiving light, the illuminance of the image sensor 1 is decreased, and the image sensor 1 performs automatic exposure adjustment, such that the illuminance of the image sensor 1 returns to a balanced value. An area circled by broken lines in FIG. 7 represents the time when an illuminance L is at the lowest (approximately between 0.0004 lux and 1 lux), and a certain period of time has elapsed since turning off the light-emitting diodes 2. The certain period of time is the time interval T that is approximately between 10 milliseconds and 200 milliseconds. Preferably, the illuminance of the image sensor 1 is decreased to 0.0004 lux at 200 milliseconds after turning off the light-emitting diodes 2. However, it should be noted that, the image sensor 1 is still white balanced to the color temperature of 3200K at this time.

In other words, after turning on the light-emitting diodes 2 such that the image capture region A corresponding to the image sensor 1 is white balanced, the light-emitting diodes 2 is turned off immediately, such that the illuminance (luminous flux that is received) of the image sensor 1 is decreased to as low as 0.0004 lux. In other words, the image sensor 1 is white balanced to (approximately or equal to) a color temperature of 3200K and is under a condition of low illuminance. At this time, by having the image sensor 1 perform image capture on the target object in the image capture region A, the preprocessing frame M can be generated.

The embodiment of the present disclosure is mainly applied to recognize a target object in front of a vehicle that is driven under dim light (e.g., nighttime) or severe weather conditions (e.g., rain or fog). To a driver in the vehicle, the target object can be a pedestrian, other vehicles, etc. For example, when the driver drives the vehicle during nighttime, and turns on a headlamp for illuminating the front of the vehicle, the target object can be an oncoming driven vehicle having a headlamp turned on. At this time, the image sensor 1 is aimed at the light-emitting headlamps of the oncoming vehicle and performs image capture. Generally, when a newly manufactured vehicle is shipped from a factory, according to safety regulations, a color temperature of headlamps of the newly manufactured vehicle is maintained at 3200K. Therefore, by using the preprocessing method for improving image recognition of the present disclosure, in the preprocessing frame M generated by the image sensor 1 performing image capture on the light-emitting headlamps of the oncoming vehicle, a brightness (due to the image sensor 1 being maintained to be white balanced at a color temperature of 3200K) of the target object (i.e., the headlamp of the oncoming vehicle emitting a light having a color temperature of 3200K) can be further enhanced, and the surrounding environment can be further darkened (due to the image sensor 1 performing image capture under the condition of the lowest illuminance).

In this embodiment, the arrangement of the three light-emitting diodes 2 and the image sensor 1 allows the illumination area ranges 3 of the white light sources to cover the image capture region A. In the present disclosure, the illumination area ranges 3 of the three white light sources at least cover one half of the whole image capture region A. That is to say, a distance between the light-emitting diodes 2 and the image sensor 1 affects a size of the overlapping region AA of the illumination area ranges 3 in the image capture region A. Specifically, a luminous intensity of light projected on the image sensor 1 by the light-emitting diodes 2 that are spaced apart from the image sensor 1 by a gap D is approximately equal to a luminous intensity of light projected on the image sensor 1 by an external light source at a predetermined distance from the image sensor 1. The term "luminous intensity", also known in brief as "light intensity" or "luminosity", represents a physical measure of the wavelength-weighted power emitted by a light source in a particular direction per unit solid angle, and is measured in units of candela.

In the above-mentioned example, the light-emitting headlamp of the oncoming vehicle is the external light source. Since all oncoming vehicles approach the vehicle driven by the driver from an opposite direction, the predetermined distance is between 30 meters and 155 meters, and is preferably 155 meters. That is, when the oncoming vehicle is 155 meters from the vehicle of the driver, image recognition is required to be performed on the oncoming vehicle. Therefore, a luminous intensity of light projected on the image sensor 1 by the external light source at a predetermined distance of 155 meters from the image sensor 1 is equal to the luminous intensity of the light projected on the image sensor 1 by the light-emitting diodes 2 that are spaced apart from the image sensor 1 by the gap D. Therefore, the gap D can be adjusted with the luminous intensity being fixed, or the luminous intensity of the light projected on the image sensor 1 by the light-emitting diodes 2 can be adjusted with the gap D being fixed. In this embodiment, the gap D is adjusted to be between 10 millimeters and 15 millimeters.

Beneficial Effects of the Embodiment

In conclusion, by virtue of "disposing the three light-emitting diodes 2 at a left side, a right side, and a lower side of the image sensor 1, respectively, in which the image sensor 1 corresponds to the image capture region A", "turning on the three light-emitting diodes 2, such that each of the light-emitting diodes 2 emits at least one white light source having a color temperature of 3200K, in which each of the white light sources has a fixed illumination area range 3, and the illumination area ranges 3 of the three white light sources at least cover one half of the image capture region A, such that a color temperature of the covered half of the image capture region A is approximately or equal to 3200K", "turning off the three light-emitting diodes 2 for a time interval T, such that the image sensor 1 captures images to generate a preprocessing frame M under a low illuminance condition between 0.0004 lux and 1 lux", and "alternatingly turning on and off the three light-emitting diodes 2, such that the image sensor 1 generates a plurality of the preprocessing frames M", the preprocessing method for improving image recognition provided in the present disclosure is capable of improving image recognition during nighttime and reducing misjudgments.

Another beneficial effect of the present disclosure is that, by virtue of "the image sensor 1 corresponding to the image capture region A", "the three light-emitting diodes 2 being disposed at a left side, a right side, and a lower side of the image sensor 1, respectively, each of the light-emitting diodes 2 emitting at least one white light source having a color temperature of 3200K, and each of the white light sources having a fixed illumination area range 3", "the illumination area ranges 3 of the three white light sources at least covering one half of the image capture region A, such that a color temperature of the covered half of the image capture region A being approximately or equal to 3200K", and "the image sensor 1 generating a preprocessing frame M under a low illuminance condition between 0.0004 lux and 1 lux, and the low illuminance condition is generated by turning on and off the three light-emitting diodes 2 once", the preprocessing system for improving image recognition provided in the present disclosure is capable of improving image recognition during nighttime and reducing misjudgments.

Furthermore, in order to solve the issue in the current technology that an image captured during nighttime or under severe weather conditions is difficult to recognize, in the present disclosure, the white light LED that emit lights having a color temperature of 3200K is configured to surround the image sensor 1 and is alternatingly turned on and turned off. In this way, before performing image capture, the image sensor 1 has a color temperature maintained at 3200K after undergoing automatic white balance adjustment, and is maintained at a low illuminance after undergoing automatic exposure adjustment. As a result, in the obtained preprocessing frame M, a brightness of the target object is further enhanced, and the surrounding environment is further darkened, which are advantageous for further performing image recognition process.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A preprocessing method for improving image recognition, comprising:
    disposing at least one light-emitting diode to surround an image sensor, the image sensor corresponding to an image capture region;
    turning on the at least one light-emitting diode, such that the at least one light-emitting diode emits at least one white light source having a color temperature of 3200K, wherein the at least one white light source has a fixed illumination area range, and the illumination area range covers the image capture region, so that a color temperature of the image capture region is approximately or equal to 3200K; and
    turning off the at least one light-emitting diode for a time interval, such that the image sensor captures images to generate a preprocessing frame under a low illuminance condition that is between 0.0004 lux and 1 lux;
    wherein the time interval is between 10 milliseconds and 200 milliseconds.

2. The preprocessing method according to claim 1, further comprising:
    alternatingly turning on and off the light-emitting diode, such that the image sensor generates a plurality of the preprocessing frames.

3. The preprocessing method according to claim 1, wherein the at least one light-emitting diode is spaced apart from the image sensor by a gap, and a luminous intensity of light projected at the image sensor by the at least one light-emitting diode is equal to a luminous intensity of light projected at the image sensor by an external light source at a predetermined distance from the image sensor.

4. The preprocessing method according to claim 3, wherein the gap is between 10 millimeters and 15 millimeters.

5. The preprocessing method according to claim 3, wherein the predetermined distance is between 30 meters to 155 meters.

6. A preprocessing method for improving image recognition, comprising:
- disposing three light-emitting diodes at a left side, a right side, and a lower side of an image sensor, respectively, the image sensor corresponding to an image capture region;
- turning on the three light-emitting diodes, such that each of the light-emitting diodes emits at least one white light source having a color temperature of 3200K, wherein each of the white light sources has a fixed illumination area range, and the illumination area ranges of the three white light sources at least cover one half of the image capture region, such that a color temperature of the covered half of the image capture region is approximately or equal to 3200K;
- turning off the three light-emitting diodes for a time interval, such that the image sensor captures images to generate a preprocessing frame under a low illuminance condition that is between 0.0004 lux and 1 lux; and
- alternatingly turning on and off the three light-emitting diodes, such that the image sensor generates a plurality of the preprocessing frames;
- wherein the time interval is between 10 milliseconds and 200 milliseconds.

7. A preprocessing system for improving image recognition, comprising:
- an image sensor corresponding to an image capture region; and
- three light-emitting diodes disposed at a left side, a right side, and a lower side of the image sensor, respectively, each of the light-emitting diodes emitting at least one white light source having a color temperature of 3200K, and each of the white light sources having a fixed illumination area range;
- wherein the illumination area ranges of the three white light sources at least cover one half of the image capture region, such that a color temperature of the covered half of the image capture region is approximately or equal to 3200K;
- wherein the image sensor generates a preprocessing frame under a low illuminance condition between 0.0004 lux and 1 lux, and the low illuminance condition is generated by turning on and off the light-emitting diodes once;
- wherein the light-emitting diodes elapse a time interval since turning off, and the time interval is between 10 milliseconds and 200 milliseconds.

8. The preprocessing system according to claim 7, wherein the three light-emitting diodes are spaced apart from the image sensor by a gap, and a luminous intensity of light projected at the image sensor by the three light-emitting diodes is equal to a luminous intensity of light projected at the image sensor by an external light source at a predetermined distance from the image sensor.

9. The preprocessing system according to claim 8, wherein the gap is between 10 millimeters and 15 millimeters.

10. The preprocessing system according to claim 8, wherein the predetermined distance is between 30 meters to 155 meters.

* * * * *